US012534165B2

(12) United States Patent
Kiji et al.

(10) Patent No.: US 12,534,165 B2
(45) Date of Patent: Jan. 27, 2026

(54) AUTOMATIC BERTHING SYSTEM FOR WATERCRAFT

(71) Applicant: HONDA MOTOR CO., LTD., Tokyo (JP)

(72) Inventors: Marudan Kiji, Saitama (JP); Ryuta Suzuki, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 204 days.

(21) Appl. No.: 18/491,947

(22) Filed: Oct. 23, 2023

(65) Prior Publication Data

US 2025/0128797 A1  Apr. 24, 2025

(51) Int. Cl.
 *G05D 1/02* (2020.01)
 *B63B 49/00* (2006.01)
 *G05D 1/00* (2006.01)

(52) U.S. Cl.
 CPC .......... *B63B 49/00* (2013.01); *G05D 1/0206* (2013.01)

(58) Field of Classification Search
 CPC ......... B63B 49/00; B63B 79/40; B63B 79/15; G05D 1/0206; B63H 25/04
 See application file for complete search history.

(56) References Cited

U.S. PATENT DOCUMENTS 11,385,060 B2 * 7/2022 Yamazaki ............ G05D 1/0206
12,351,287 B2 * 7/2025 Yamaguchi ............ B63B 79/40
2021/0347449 A1 * 11/2021 Dake .................... B63B 79/40
2022/0028278 A1 * 1/2022 Hara ...................... G08G 3/00
2025/0189667 A1 * 6/2025 Kato ...................... G01S 17/10
2025/0189674 A1 * 6/2025 Kato ...................... G01S 17/89
2025/0196979 A1 * 6/2025 Kato ...................... G05D 1/661
2025/0199175 A1 * 6/2025 Kato ...................... B63H 25/04

FOREIGN PATENT DOCUMENTS

| EP | 3889030 A1 | 10/2021 |
|---|---|---|
| JP | 7044018 B2 | 3/2022 |
| JP | 2022106753 A | 7/2022 |

OTHER PUBLICATIONS

Extended European Search Report for European Patent Application No. 24207143.9 dated Feb. 25, 2025; 7 pp.

* cited by examiner

*Primary Examiner* — Masud Ahmed

(74) *Attorney, Agent, or Firm* — Armstrong Teasdale LLP

(57) ABSTRACT

An automatic berthing system for watercraft, comprising: an environment sensor configured to detect objects around own watercraft; and a control unit configured to control the watercraft, and including a processor for processing an output of the environment sensor, wherein the processor is configured to create an environment map containing outer profiles and positions of the objects according to an output of the environment sensor; to extract vacant berthing spots from the environment map; and to select an optimum berthing spot that has a size suitable for the own watercraft to berth thereat from the extracted vacant berthing spots.

16 Claims, 10 Drawing Sheets

AUTOMATIC BERTHING SYSTEM FOR WATERCRAFT

TECHNICAL FIELD

The present disclosure relates to an automatic berthing system for watercraft.

BACKGROUND ART

In recent years, there have been active efforts to provide access to sustainable transportation systems that consider vulnerable people that can be found among transportation participants. For example, in order to further improve the safety and convenience of transportation means, research and development efforts have been directed to automatic piloting of various forms of watercraft.

Among various ship handling operations, docking/berthing is considered to be the most difficult. JP2022-106753A discloses an automatic berthing system for watercraft. This automatic berthing system includes a camera, a control unit that automatically controls navigation and berthing of watercraft to a berthing spot, and an interface. The control unit detects the pier by performing an image recognition process on image data obtained from around the watercraft obtained by the camera, determines the position of the pier, and outputs this data to the interface as a candidate for the berthing spot. The interface displays on the display of the terminal device a graphic image indicating the berthing spot candidate superimposed on the photographed image of the pier.

JP7044018B2 discloses a berthing control system that can support the berthing operation of watercraft. This berthing control system includes a memory device that stores berthing information including position information of the berthing spots and information on the heading of the watercraft that is to be moored at each berthing spot, and a processor. The processor extracts multiple berthing spot candidates where the watercraft can potentially berth based on prescribed conditions, determines whether the watercraft can berth for each of the berthing spot candidates, and displays information on the berthing spot candidates including feasibility of berthing on the display unit.

SUMMARY OF THE INVENTION

However, the automatic berthing system disclosed in JP2022-106753A fails to evaluate the size of the potential berthing spot. The extracted berthing spot may be too small for the own watercraft to properly berth. Conversely, the extracted berthing spot may be too big for the own watercraft, causing unnecessary expenses or causing inconvenience to other watercraft.

The berthing control system disclosed in JP7044018B2 cannot extract berthing spot candidates unless position information of the berthing position of the ship is stored in advance. Therefore, this system may be able to automatically berth watercraft at piers where the watercraft has previously berthed but not at piers that the watercraft has not visited before.

In view of such a problem of the prior art, a primary object of the present invention is to provide an automatic berthing system for watercraft that can identify piers that have not been visited before, and can extract suitable berthing spots suitable for the own watercraft. Furthermore, the present invention will contribute to the development of sustainable transportation systems.

To achieve such an object, a certain aspect of the present invention provides an automatic berthing system (1) for watercraft (2), comprising: an environment sensor (25) configured to detect objects around own watercraft; and a control unit (10) configured to control the watercraft, and including a processor (11) for processing an output of the environment sensor, wherein the processor is configured to create an environment map containing outer profiles and positions of the objects according to an output of the environment sensor; to extract vacant berthing spots from the environment map; and to select an optimum berthing spot that has a size suitable for the own watercraft to berth thereat from the extracted vacant berthing spots.

According to this configuration, since the control unit includes a processor that processes the output of the environment sensor, and the processor extracts vacant berthing spots based on the environment map, vacant berthing spots can be extracted from the pier which the own watercraft has never visited before. In addition, since the processor selects the optimum berthing spot suitable for the own watercraft from among the possible vacant berthing spots, the own watercraft can be berthed at the pier in a favorable manner.

Preferably, this automatic berthing system for watercraft further comprises a display device (17), wherein the processor is configured to display the environment map on the display device.

Thereby, the user can visually learn the state of the environment around the watercraft via the environment map displayed on the display device.

Preferably, in this automatic berthing system for watercraft, the control unit comprises a storage device (13) storing a regional map depicting a surrounding body of water, wherein the processor is configured to overlay the environment map and the regional map with each other on the display device.

Thereby, the user can visually recognize the environment map and the map of the surrounding body of water on the display device so that the user can easily understand the relationship between the situation in the environment and the map of the surrounding body of water.

Preferably, in this automatic berthing system for watercraft, the environment sensor is configured to capture an image of an environment surrounding the watercraft, wherein the processor is configured to identify a pier (P) from the captured image, extract the vacant berthing spots from regions located along the pier, and display the vacant berthing spots on the display device.

By identify piers from various objects detected by the imaging sensor, the processor is able to extract vacant berthing spots in an accurate manner.

Preferably, in this automatic berthing system for watercraft, the processor is configured to identify a plurality of piers from the captured image, detect other watercraft moored to the piers, assign different classifications to the piers according to sizes of the other watercraft moored thereto, and assign different priorities to optimum berthing spot candidates according to the classifications of the piers which the vacant berthing spots belong to.

Thereby, the processor is able to select the optimum berthing spot belonging to a pier that suits the size of the own watercraft.

Preferably, in this automatic berthing system for watercraft, the environment sensor comprises at least one of a visible light image sensor (29) and a lidar (30).

Thereby, the processor is able to acquire the image of the piers and watercraft that are moored to the piers so that the optimum berthing spot can be selected in a reliable manner.

Preferably, in this automatic berthing system for watercraft, the environment sensor comprises a three-dimensional sensor (25), and the processor is configured to create a three-dimensional environment map from an output of the three-dimensional sensor, and convert the three-dimensional environment map into a two-dimensional environment map that covers a region extending over a prescribed vertical distance from a water surface.

Thereby, the berthing spots that are suitable for the own watercraft can be accurately extracted. By limiting the coverage of the two-dimensional environment map in the vertical direction to the prescribed vertical distance from a water surface, roofs and other overhead structures may be eliminated when extracting the berthing spots so that the berthing spots can be extracted in a particularly accurate manner.

Preferably, in this automatic berthing system for watercraft, the prescribed vertical distance is greater than a height of the own watercraft.

Thereby, the berthing spots that suit the own watercraft can be extracted in an accurate manner.

Preferably, in this automatic berthing system for watercraft, the processor is configured to accept a minimum size for the vacant berthing spots.

By allowing the minimum size for the vacant berthing spots to be designated from an input unit or the like, the optimum berthing spot can be selected in an efficient manner.

Preferably, in this automatic berthing system for watercraft, the processor is configured to extract the vacant berthing spots as bounding boxes (B).

Thereby, the computing process for extracting the vacant berthing spots can be simplified, and isolated obstacles can be eliminated in an efficient manner.

Preferably, in this automatic berthing system for watercraft, the size of each vacant spot is evaluated by lengths of sides of the corresponding bounding box.

Thereby, the size of each vacant berthing spot can be evaluated in an efficient manner.

Preferably, this automatic berthing system for watercraft further comprises an input unit (23) for accepting an initiation of an automatic berthing operation, wherein the processor is configured to start extracting vacant berthing spots upon accepting the initiation of the automatic berthing operation.

Thereby, the berthing operation is performed according to the desire of the user.

Preferably, in this automatic berthing system for watercraft, when multiple vacant berthing spots are extracted, the input unit is configured to accept a selection of one of the vacant berthing spots by a user.

By leaving the final choice to the user, the selection of the optimum berthing spot can be achieved in such a manner as to suit the preference of the user.

Preferably, in this automatic berthing system for watercraft, the input unit is configured to accept a selection of a heading of the own watercraft for the selected optimum berthing spot.

Thereby, the heading of the watercraft at the berthing spot can be selected according to the preference of the user.

Preferably, in this automatic berthing system for watercraft, the processor is configured to set the selected optimum berthing spot as a destination, generate a path for the own watercraft to reach the destination from a current position, and control the own watercraft to navigate to the destination via the generated path.

Thereby, the berthing operation is automatically performed without minimum human intervention.

Preferably, in this automatic berthing system for watercraft, the processor is configured to position and maintain the own watercraft at the selected optimum berthing spot after the own watercraft has reached the selected optimum berthing spot.

Thereby, the user is allowed to moor the watercraft and disembark/embark the watercraft in a comfortable manner.

Thus, the present invention provides an automatic berthing system for watercraft that can identify piers that have not been visited before, and can extract suitable berthing spots suitable for the own watercraft. Furthermore, the present invention will contribute to the development of sustainable transportation systems.

DESCRIPTION OF THE PREFERRED EMBODIMENT(S)

The present invention will be described in the following in terms of a specific embodiment with reference to the appended drawings.

Figure 1:
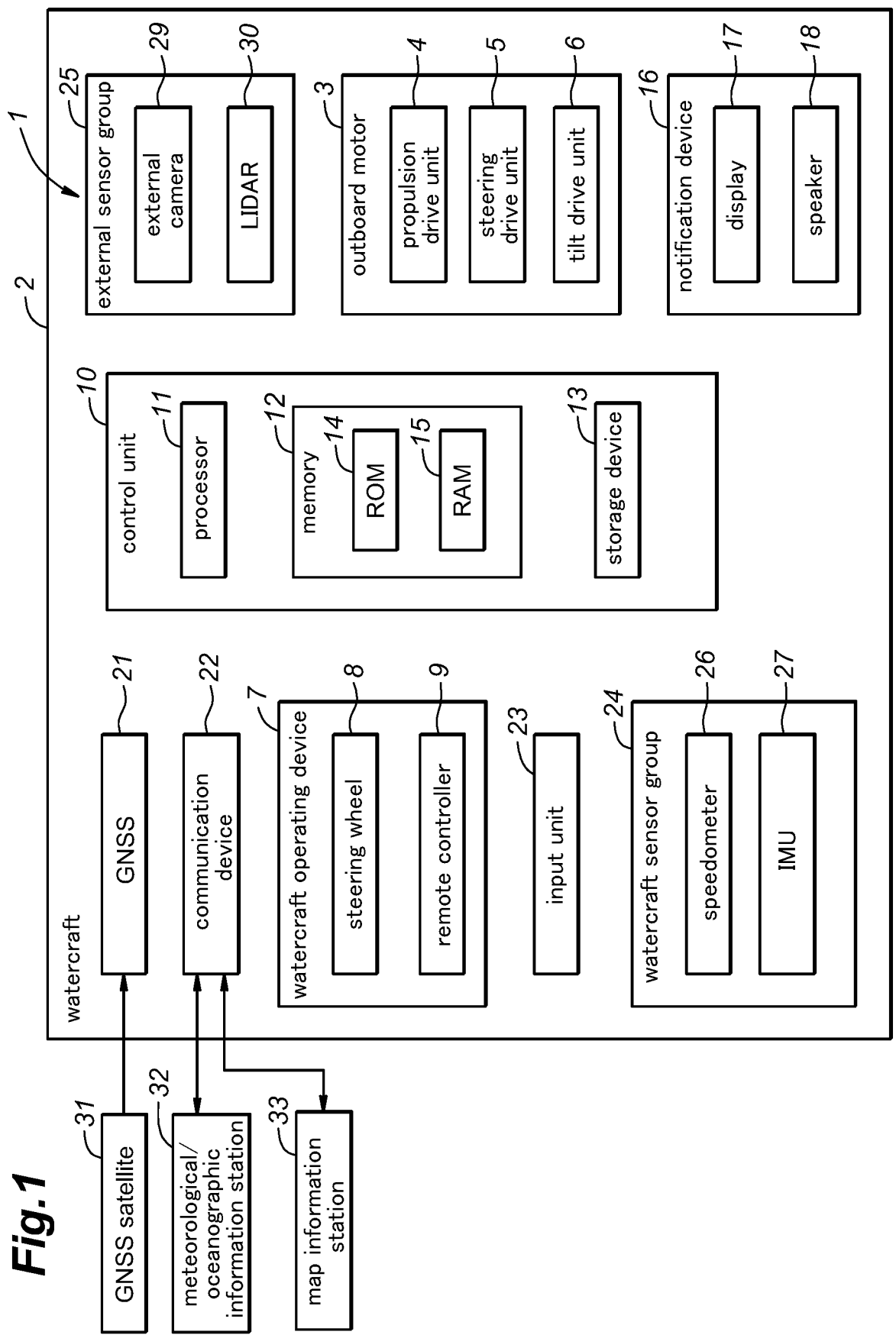
FIG. 1 is a block diagram of an automatic berthing/piloting system for watercraft according to an embodiment of the present invention.

FIG. 1 is a schematic diagram of watercraft 2 incorporated with an automatic berthing system 1 according to an embodiment of the present invention. The watercraft 2 consists of a small boat fitted with an outboard motor 3 as a propulsion device. The watercraft 2 may also be fitted with multiple outboard motors 3. In this case, the outboard motor 3 is attached to the stern of the watercraft 2 so as to be tiltable around a vertical axis and a lateral axis.

The outboard motor 3 is a propulsion device that generates a propulsion force, and includes a propeller in a lower end thereof, and a drive source for driving the propeller. The drive source may be an internal combustion engine or an electric motor. A watercraft operating device 7 for operating the outboard motor 3 is installed in the cabin of the watercraft 2. The watercraft operating device 7 includes a steering wheel 8 for changing the heading of the watercraft 2 by turning the outboard motor about a vertical axis, and a remote controller 9 for changing the propulsion force of the watercraft 2. The steering wheel 8 may be of a steer-by-wire type, a cable type or a mechanical type which is configured to be operated by a user, and is additionally provided with a steering drive unit 5 which is a servo actuator for electronic steering control. The remote controller 9 may be of a lever type or a dial type which is configured to be operated by a user, and is additionally provided with a propulsion drive unit 4 which is configured for electronic propulsion control.

The outboard motor 3 also includes a tilt drive unit 6 for tilting the outboard motor 3 about the horizontal axis. The propulsion drive unit 4, the steering drive unit 5 and the tilt drive unit 6 each have an electric motor as a drive source. The steering drive unit 5 is a steering device for changing the heading of the watercraft 2. The steering drive unit 5 sets the rudder angle of the watercraft 2 by turning the outboard motor 3, but may also be configured to set the rudder angle by turning a rudder plate provided behind the propeller around the vertical axis.

Also, the watercraft 2 is equipped with a control unit 10 that controls the outboard motor 3 by using the propulsion drive unit 4 and the steering drive unit 5. The control unit 10 is an electronic control unit essentially consisting of a computer, which includes a processor 11 such as a central processing unit (CPU), memory 12, and a storage device 13, and is configured to execute predetermined arithmetic processing. The memory 12 comprises read only memory (ROM 14) and random access memory (RAM 15). The storage device 13 may be a hard disk drive (HDD), solid state drive (SSD), or the like. The storage device 13 stores a map or a chart of the surrounding body of water. The control unit 10 is programmed so that the processor 11 reads necessary data and application software from the storage device 13 and executes a predetermined arithmetic processing according to the application software.

The control unit 10 controls the outboard motor 3 based on an input to the watercraft operating device 7. More specifically, the control unit 10 controls the steering drive unit 5 according to the steering amount of the steering wheel 8 so that the propeller may be oriented in a corresponding direction. Further, the control unit 10 controls the propulsion drive unit 4 so that the propeller generates a corresponding propulsion force according to the operating amount of the remote controller 9. Further, the control unit 10 controls the tilt drive unit 6 so that the propeller is submerged in the water or raised in the air according to the operation of a tilt switch (not shown in the drawings).

In addition, a notification device 16 is mounted in the cabin of the watercraft 2. The notification device 16 has a display 17 and a speaker 18. The notification device 16 is connected to and controlled by the control unit 10. The display 17 displays a screen displaying various pieces of information about the watercraft 2 and a guidance screen of the navigation device. Objects (obstacles) around the watercraft 2 (other ships, embankments, piers, etc.) are displayed on the guidance screen of the navigation device. It should be noted that the control unit 10 may be configured as a piece of hardware, or may be configured as a unit composed of a plurality of pieces of hardware.

Furthermore, the watercraft 2 is equipped with a satellite positioning system (GNSS 21), a communication device 22, an input unit 23, a watercraft sensor group 24, and an environment sensor group 25. The watercraft sensor group 24 includes a speedometer 26, and an IMU 27 (Inertial Measurement Unit). The environment sensor group 25 includes an external camera 29 and a lidar 30 (Laser Imaging Detection and Ranging). The environment sensor group 25 may include a lidar (Laser Imaging Detection and Ranging). The GNSS 21, the communication device 22, the input unit 23, the watercraft sensor group 24 and the environment sensor group 25 are connected to the processor 11.

The GNSS 21 receives information such as satellite positions and transmission times transmitted from a plurality of GNSS satellites 31, and determines the position of the GNSS 21 by computation using such information. In other words, the GNSS 21 is a current position detection device that detects the current position of the watercraft 2.

The communication device 22 performs wireless communication with other watercraft and base stations according to a command from the control unit 10. The communication device 22 comprises a transmission antenna and a reception antenna. The communication device 22 can transmit information including the position of the watercraft 2 to the outside using the transmitting antenna.

The communication device 22 receives meteorological and oceanographic information from a meteorological/oceanographic information station 32 via the receiving antenna. If the watercraft 2 is navigating on a river, the communication device 22 may receive river information instead of or in addition to oceanographic information.

In addition, the communication device 22 receives up-to-date map information from a map information station 33 or a regional information station provided in a marina or the like via the receiving antenna. The map information may include information on obstacles 34 (see FIG. 5) on the water which may include the positions and shapes of piers P, breakwaters and others which may be either natural or manmade. The up-to-date map information received by the communication device 22 is written over the old map data stored in the storage device 13.

The control unit 10 generates a composite map by superimposing the environment information acquired by the environment sensor group 25 on the map stored in the storage device 13. The environment sensor group 25 may include an external camera 29 (for visible light and infrared light), a lidar 30, a radar or the like. The control unit 10 superimposes the obstacles 34 acquired by the environment sensor group 25 on the map, and distinguishes the kinds of obstacles 34 (water surface, sky, own watercraft, other watercraft, piers P, harbors, beaches, trailers and other obstacles) according to the attributes of the various regions in the image acquired by the environment sensor group 25 according to the attributes of the different regions.

The input unit 23 is provided in the cabin and receives input of commands relating to automatic berthing of the watercraft 2 performed by the automatic berthing system 1. Commands related to automatic watercraft berthing include the start of guidance, setting a target position for automatic watercraft berthing, setting the heading of the own watercraft at the target position, setting the start of automatic watercraft berthing, the termination of automatic watercraft berthing, and the like. The input unit 23 may include buttons and a joystick provided near the display 17. The display 17 may be configured as a touch panel that serves as the input unit 23 or a part thereof.

The control unit 10 is configured to control the propulsion drive unit 4 and the steering drive unit 5 upon receiving a command to start an automatic watercraft berthing operation from the input unit 23 so that the watercraft 2 advances along the predetermined route set by the control unit 10.

The speedometer 26 in the watercraft sensor group 24 detects the sailing speed of the watercraft 2 (relative speed with respect to the water). The sea current (direction and speed of the surrounding water) can be obtained from the difference between the speed detected by the speedometer 26 and the absolute moving speed of the watercraft 2 (which may be acquired by the GNSS 21). The IMU 27 detects the rotation of the watercraft 2 around the three axes and the acceleration in the three axial directions. The rotations and accelerations detected by the IMU 27 represent the rotational and translational movements of the part of the hull where the IMU 27 is installed. The detection result of the IMU 27 is used to eliminate the influence of the rocking and other spurious movement of the watercraft 2 from the output of the environment sensor group 25. Therefore, it is preferable that the IMU 27 is positioned near the environment sensor group 25.

The external camera 29 of the environment sensor group 25 captures the image of the objects existing around the watercraft 2. The external camera 29 is configured as an image pixel sensor. The lidar 30 detects objects (obstacles 34, see FIG. 5) existing around the watercraft 2 by irradiating laser light around the watercraft and detecting the reflected laser light. The lidar 30 can detect the relative position of an object (i.e., distance and direction from the lidar 30) and the size of the object. More specifically, the lidar 30 is an obstacle sensor that detects objects around the watercraft 2 as obstacles 34. The lidar 30 is configured as an image pixel sensor. Further, the images acquired by the external camera 29 are analyzed and employed to determine the types of objects existing around the watercraft 2. More specifically, the external camera 29 also functions as an obstacle identification device that detects obstacles 34 around the watercraft 2. The environment sensor group 25 may include an external camera 29 and a lidar 30, or may include a plurality of external cameras 29 and/or a plurality of lidars 30.

The control unit 10 controls the outboard motor 3 according to the input to the watercraft operating device 7 for manual operation, and also controls the outboard motor 3 according to the input to the watercraft operating device 7 for an automatic berthing operation. More specifically, when the input unit 23 receives a designation of a target berthing spot, and an input for initiating the automatic watercraft berthing operation, the control unit 10 controls the outboard motor 3 to move the watercraft 2 from the current position which is designated as the start position to the target berthing spot according to a prescribed automatic control principle which may be referred to as automatic watercraft piloting control. The control unit 10 may designate a position which is arbitrarily selected by the user as the start position, instead of the current position of the watercraft 2.

The automatic berthing operation performed by the control unit 10 will be described in the following with reference to FIGS. 2 to 11.

Figure 2:
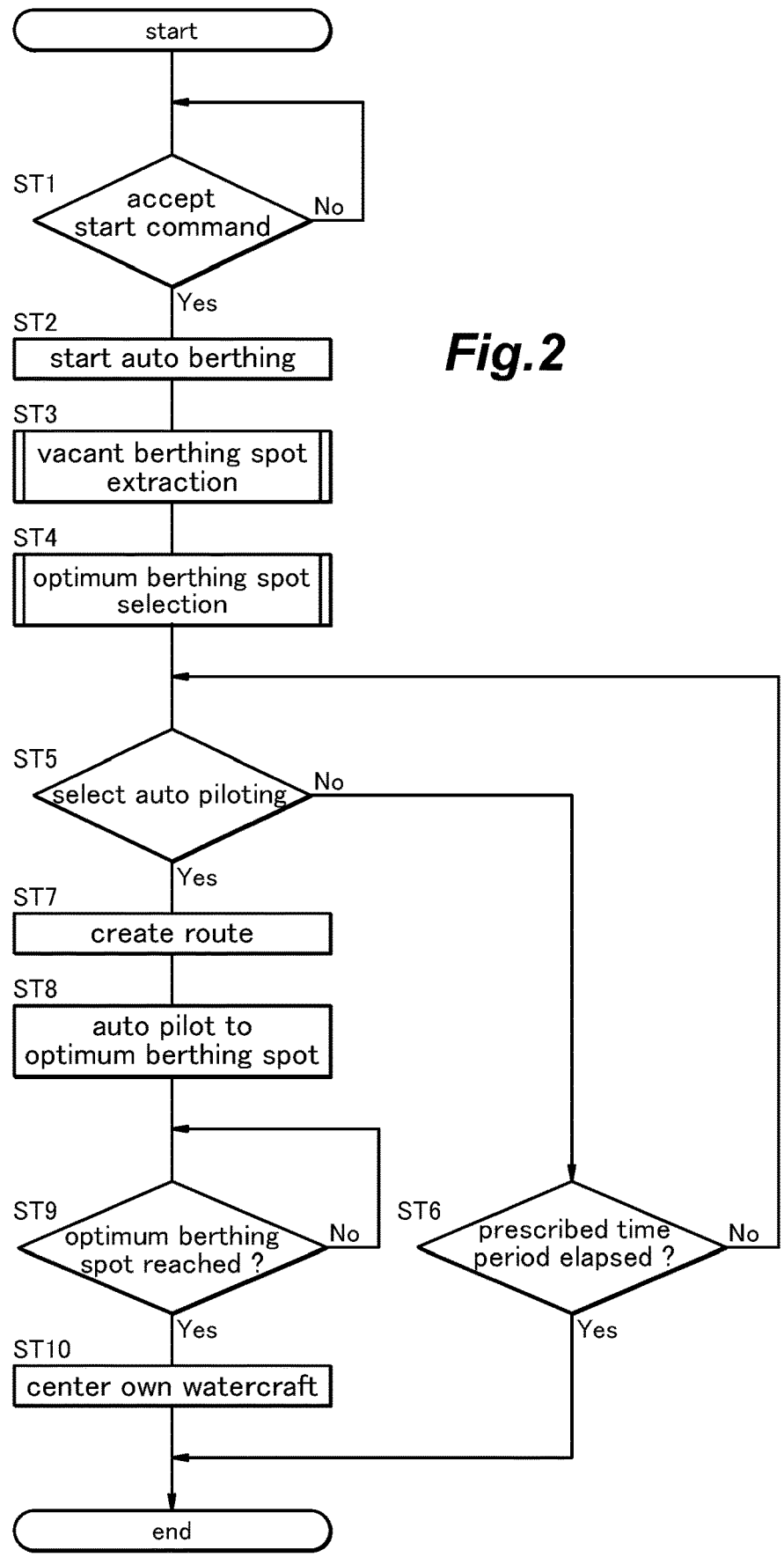
FIG. 2 is a flowchart of a process of automatic berthing/piloting performed by the automatic berthing/piloting system.

FIG. 2 is a flowchart showing the process of automatic berthing performed by the automatic berthing system 1 according to the present embodiment. Upon start-up, the processor 11 of the automatic berthing system 1 performs the automatic berthing process shown in FIG. 2. The processor 11 cyclically performs the automatic berthing process routine shown in FIG. 2 at predetermined control intervals.

The processor 11 determines if the automatic berthing start command has been received (step ST1). The automatic berthing system 1 is typically activated either automatically or manually when the own watercraft has arrived at a spot where most part of the marina or any other mooring facility comes within the view of the user. If no start command is received (ST1: No), this step is repeated. When the automatic berthing start command is received (ST1: Yes), the processor 11 starts the automatic berthing process (step ST2).

When the automatic berthing process is started, the processor 11 performs a vacant berthing spot extraction process in step ST3 to extract vacant berthing spots or berthing spot candidates.

Figure 3:
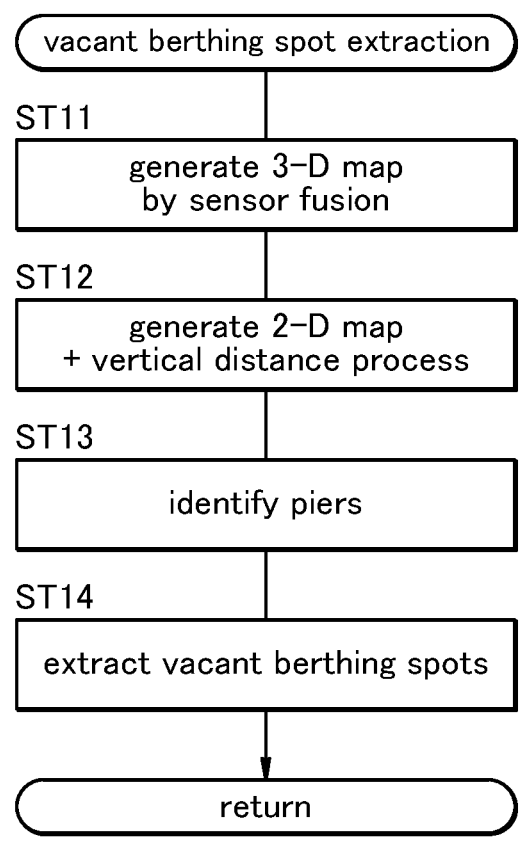
FIG. 3 is a flowchart showing the process of extracting vacant berthing spots.

The flowchart of FIG. 3 shows the vacant berthing spot extraction process. By making use of the environment sensor group 25, the processor 11 creates a three-dimensional map of the mooring facility in step ST11. A sensor fusion technique may be used in this process by using data obtained from the various sensors belonging to the environment sensor group 25. Further, map information which may consist of satellite map may be referred to when creating the three-dimensional map. The map information may be outdated. Therefore, the map information may be utilized to the extent it does not contradict the data obtained by the environment sensor group 25. Then, the three-dimensional map is converted into a two-dimensional map in step ST12. At this time, a vertical distance process is also performed. The two-dimensional map essentially provides a top view of the mooring facility. The vertical distance process eliminates any overhead structures which are greater in height than the height of the own watercraft which may be entered from the input unit 23 or pre-registered in the control unit 10. As a result, roofs, cranes or any other overhead structures which do not obstruct the passage of the own watercraft are eliminated from the two-dimensional map. In evaluating the height of an overhead structure, the changing time has to be taken into account. If there is not an adequate margin in the height, the overhead structure may interfere with the own watercraft due to a rising tide. Therefore, in evaluating the height of an overhead structure, the future change in the tide should be taken into account.

Thereafter, piers P are identified from the objects appearing on the two-dimensional map in step ST13. At this time, wall structure, breakwaters or any other tall objects which obstruct the passage of the own watercraft, and are therefore not suitable for berthing are eliminated in this identification process. Thereafter, vacant regions along the piers P are extracted as vacant berthing spots in step ST14. At this time, regions occupied by other watercraft are eliminated in this extraction process.

Figure 5:
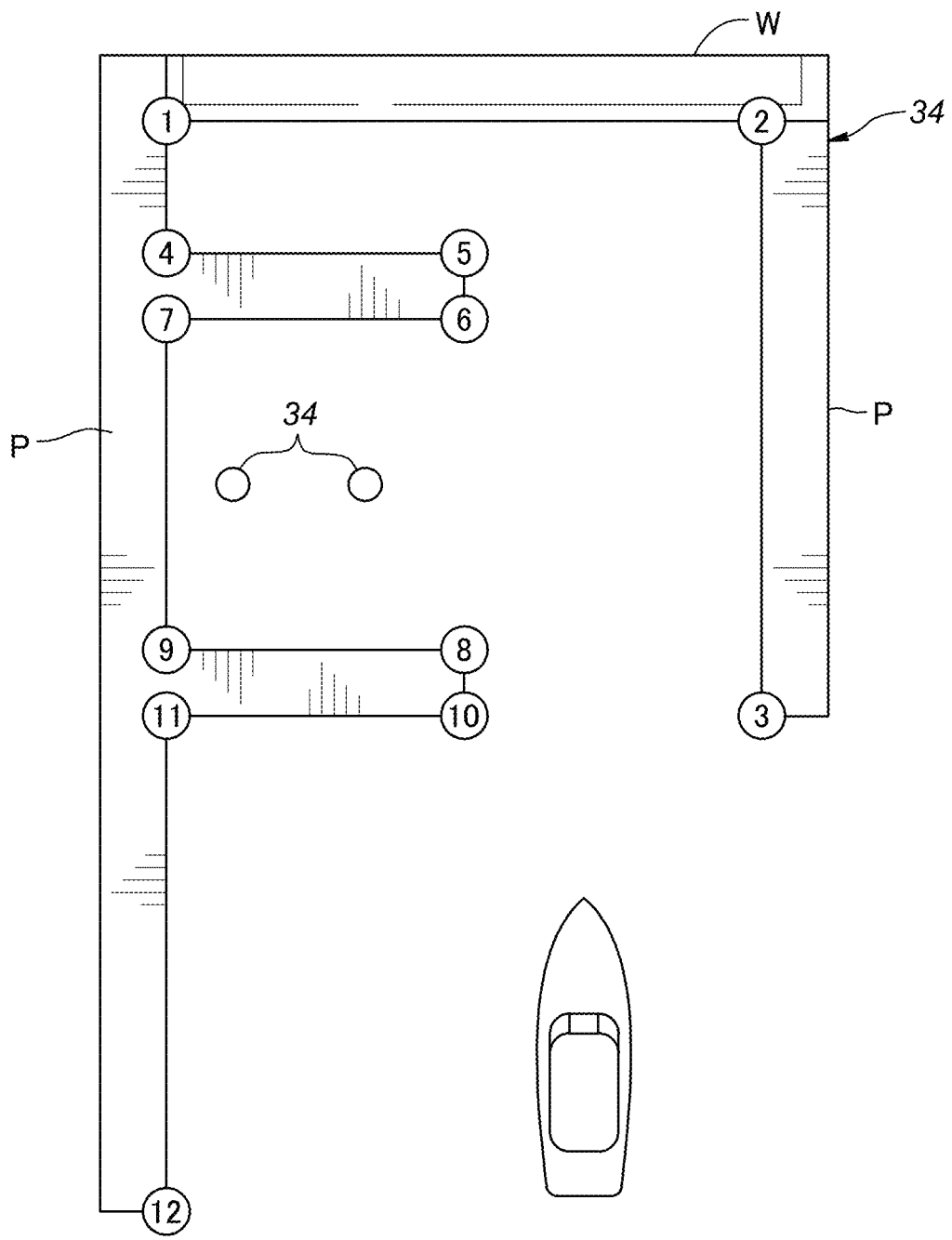
FIG. 5 is a simplified top view illustrating the process of detecting objects around the watercraft.
Figure 6:
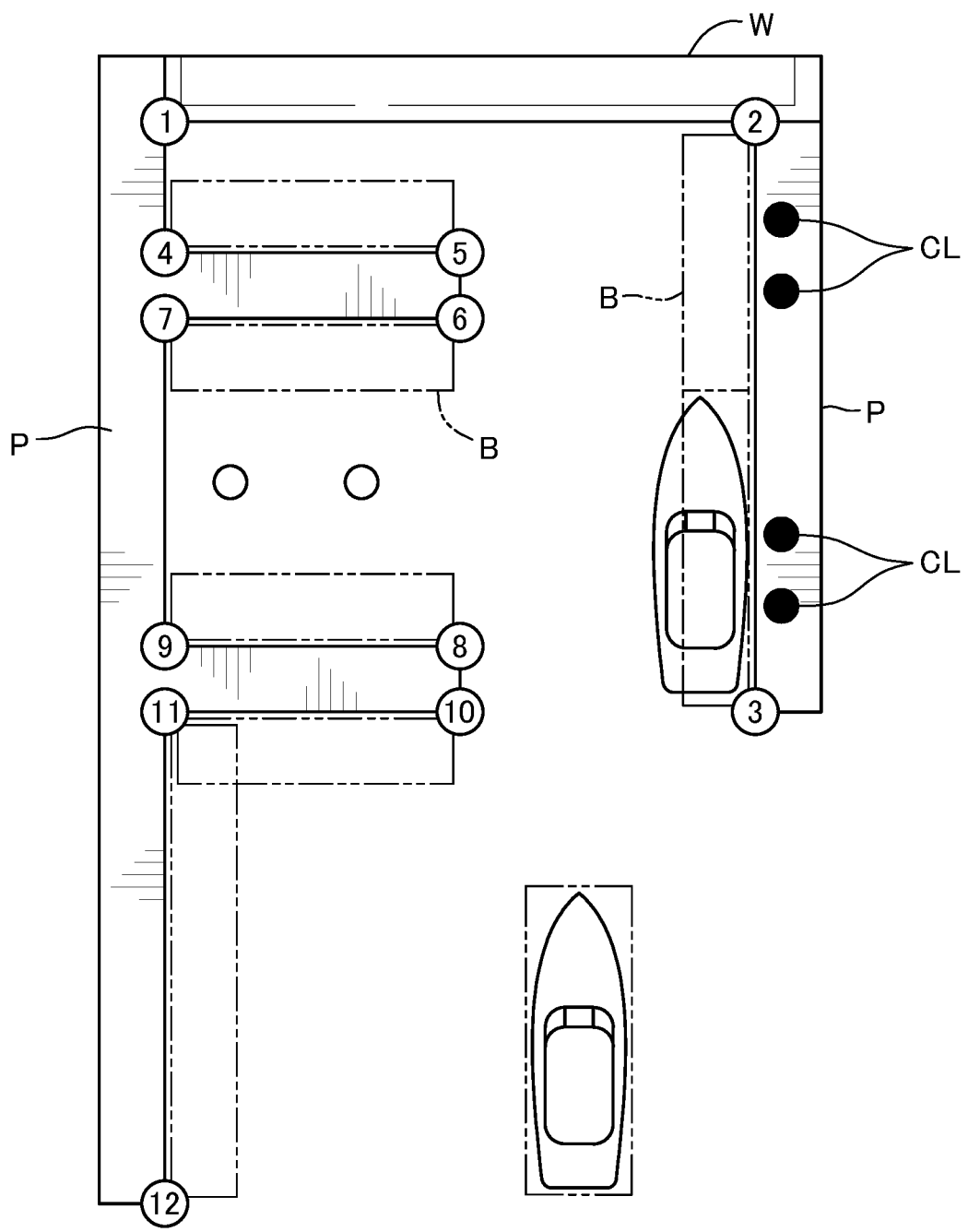
FIG. 6 is a simplified top view illustrating the process of extracting vacant berthing spots.

As shown in FIG. 5 which shows an example of the two-dimensional map, the processor 11 extracts corner points indicated by circled numerals, and identifies the piers P, and the regions along the piers P are identified as vacant berthing spots. As shown in FIG. 6, the berthing spots are extracted as bounding boxes B as indicated by the double-dot chain lines so that the algorithm for detecting berthing spots may be simplified, and mooring poles and other small isolated obstacles 34 may be accurately distinguished. Furthermore, the parts of the body of water along the piers P which are occupied by other watercraft are excluded in the extraction of the vacant berthing spots. The width and length of each bounding box B are required to be larger than those of the own watercraft. Therefore, the control unit 10 may be configured to accept the width and length of the bounding box B which are selected by the user, or may prepare a plurality of sizes stored therein for the user to select an appropriate one therefrom. Further, the control unit 10 may be configured to detect mooring equipment such as mooring cleats CL as markers for extracting the bounding boxes B or vacant mooring spots.

In this process, the three-dimensional map is also referred to so that a wall W is distinguished from a pier P, and the regions next to the wall W are excluded in the extraction of vacant berthing spots. Berthing spots may be covered by a roof, or a crane or other overhead structures may be located near the berthing spots. Since these structures do not prevent berthing of watercraft, such structures may be required to be properly taken into account.

Figure 7:
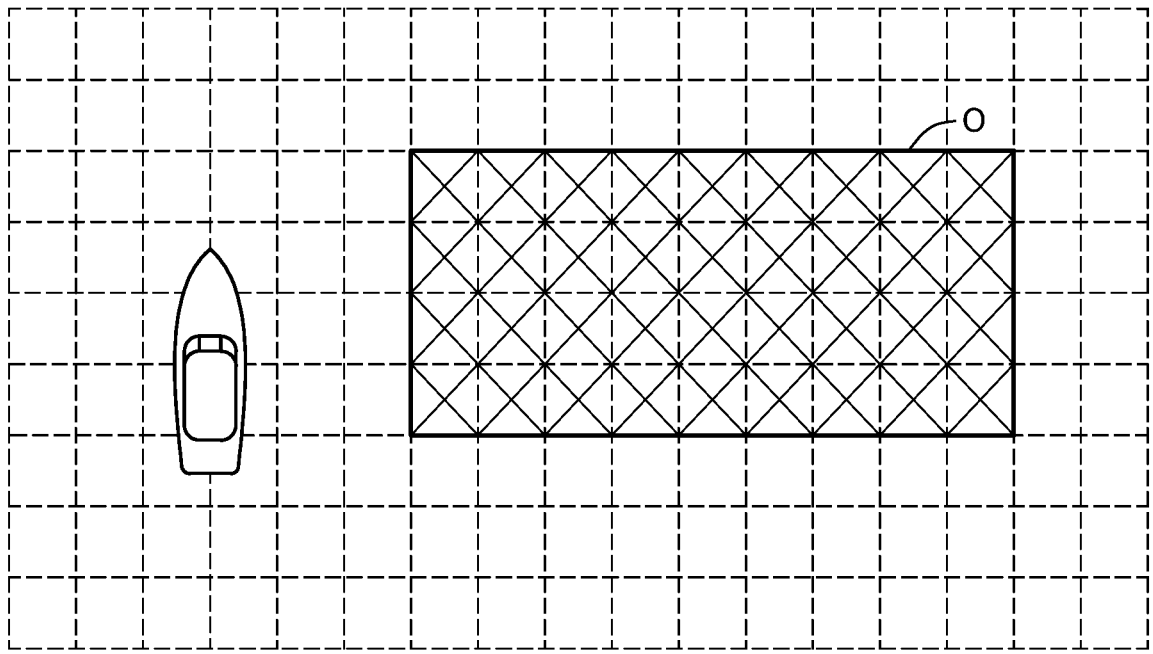
FIG. 7 is a simplified top view of the detected object before a vertical distance process.
Figure 8:
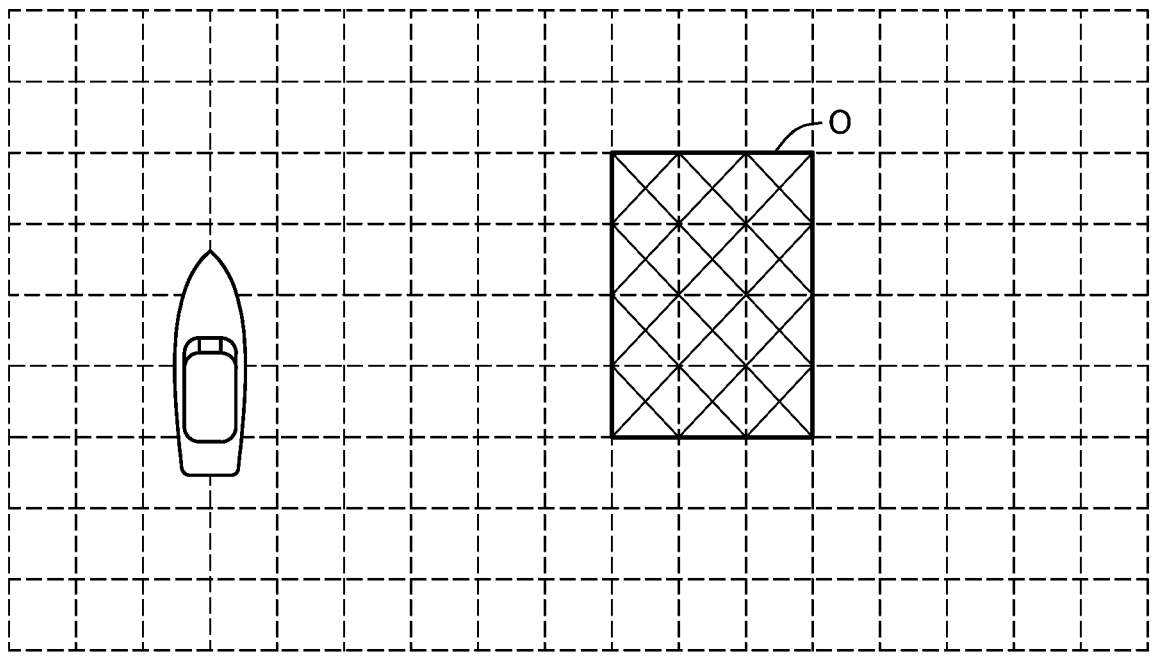
FIG. 8 is a simplified top view of an object after the vertical distance process.
Figure 9:
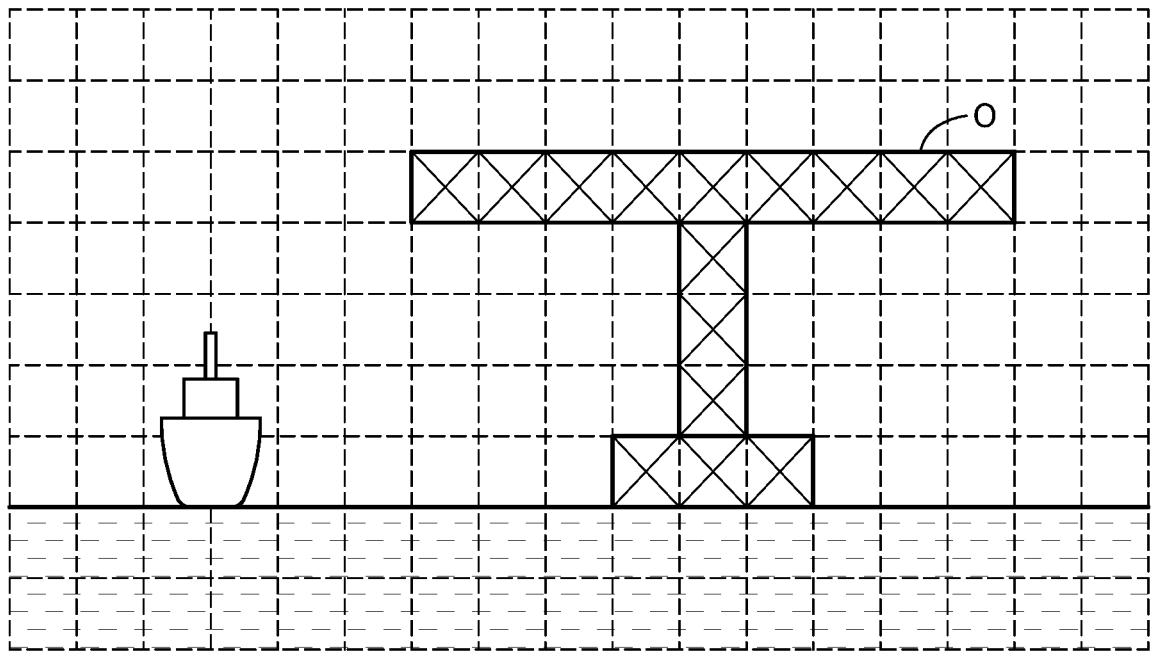
FIG. 9 is a simplified side view of a detected object.

FIGS. 7 to 9 show an overhead structure consisting of a roof O which extends above berthing spots, and in no way prevent berthing of watercraft thereunder. Although the roof O appears to prevent berthing of watercraft in simple top view (FIG. 7), the two-dimensional top view (FIG. 8) obtained from the three-dimensional map with the vertical distance process (FIG. 8) removes the roof from the obstacles 34 that prevent the passage of watercraft. As a result, only the footing of the roof O is identified as an obstacle 34 which the own watercraft should avoid.

Figure 4:
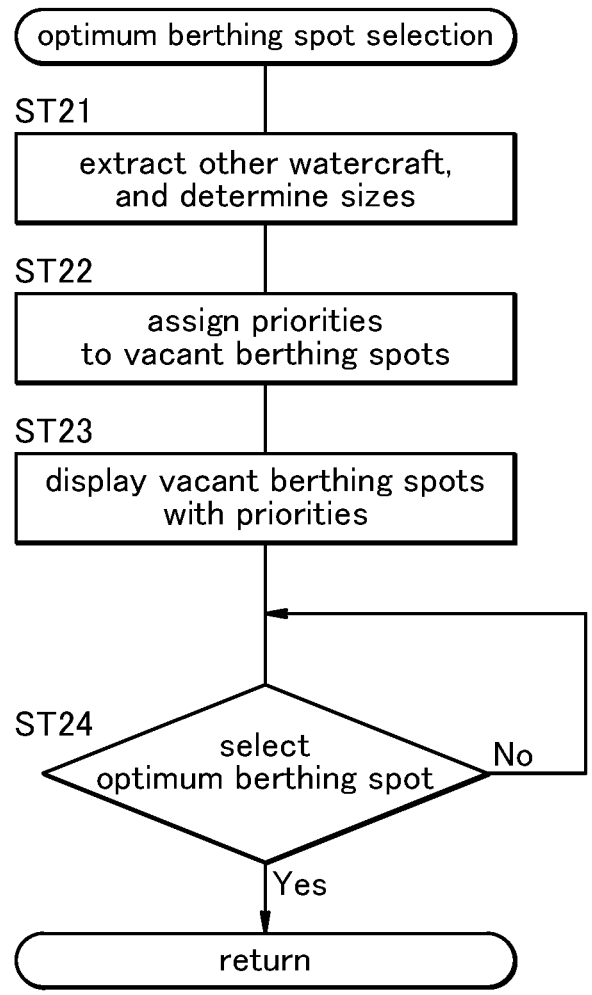
FIG. 4 is a flowchart showing the process of selecting an optimum berthing spot.

Upon completion of the vacant berthing spot extracting process, an optimum berthing spot selection process is executed in step ST4 to select an optimum berthing spot from the vacant berthing spots. The flowchart of FIG. 4 shows the optimum berthing spot selection process. Mooring facilities often have multiple piers P which are allocated to watercraft of different sizes. When there are multiple choices of berthing spots, a comparatively small berthing spot that suits the own watercraft should be selected, instead of an oversized berthing spot.

In the optimum berthing spot selection process, the sizes of other watercraft moored to different piers P are determined in step ST 21 so that the piers P may be classified according to the sizes of the watercraft moored thereto. Then, different priorities are assigned to different piers P and different berthing spots in step ST 22. The priorities may take into account not only the sizes of the berthing spots but also the nearness to the clubhouse and other land facilities.

The vacant berthing spots or available berthing spots are displayed on the display 17 in step ST23. This display may include the positions of the available berthing spots on the two-dimensional map, and the priority levels. The processor 11 then waits for the user to select the optimum berthing spot on the display 17 or the input unit 23 (step ST24: No). When selecting the optimum berthing spot, the heading of the own watercraft at the optimum berthing spot may be designated from the display 17 or the input unit 23 in step ST24. Once this selection is made (step ST24: Yes), the program flow returns to the main control routine.

Then, the processor 11 shows a display inquiring if an automatic piloting to the selected berthing spot is desired in step ST5, and waiting for the input from the user (ST5: No and ST6: No). If the user does not select automatic piloting by failing to answer the inquiry for a prescribed time period, the program flow comes to an end (ST5: No and ST6: Yes). In this case, the user navigates the own watercraft manually.

Figure 10:
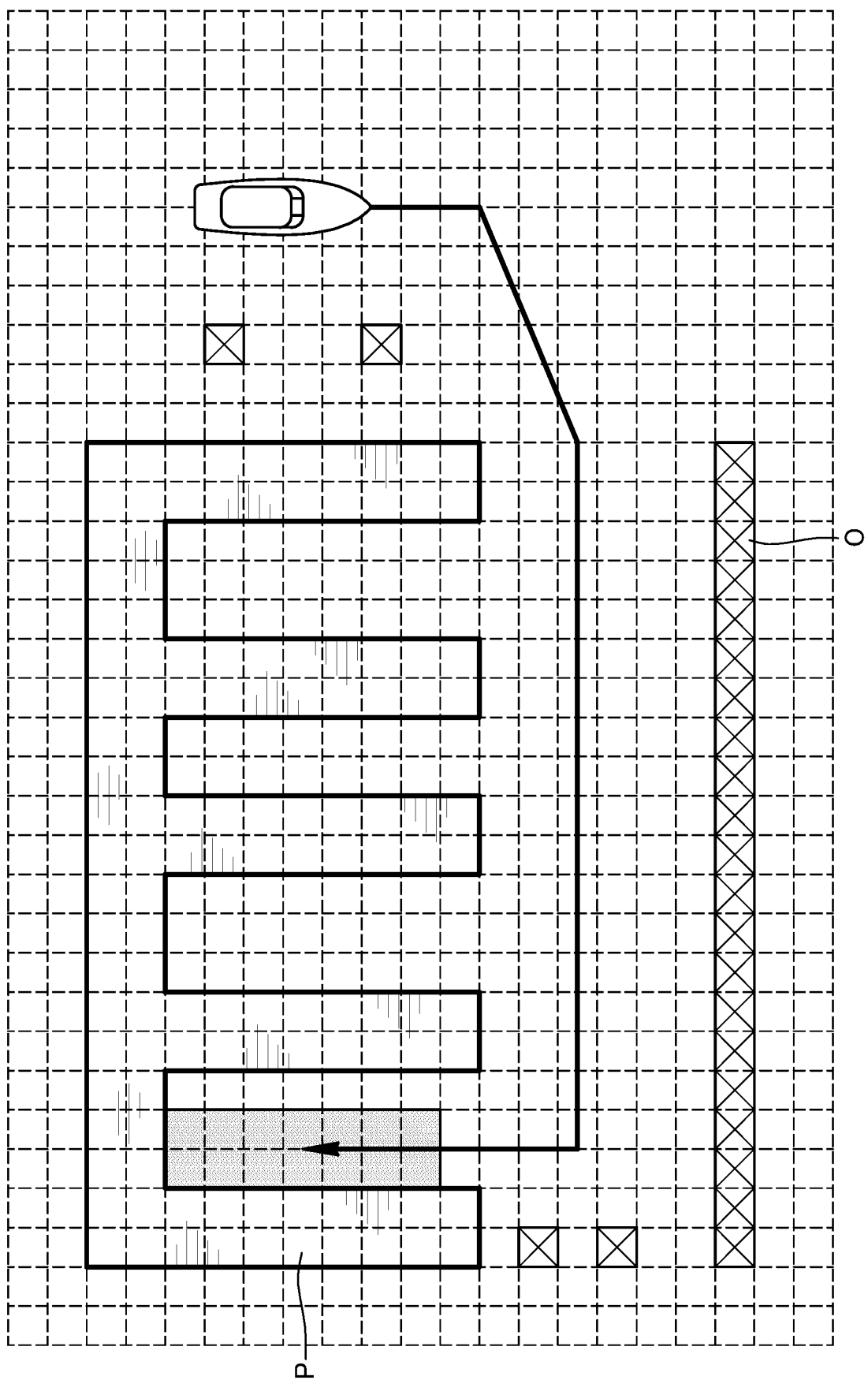
FIG. 10 is a view of a display in auto-piloting watercraft.
Figure 11:
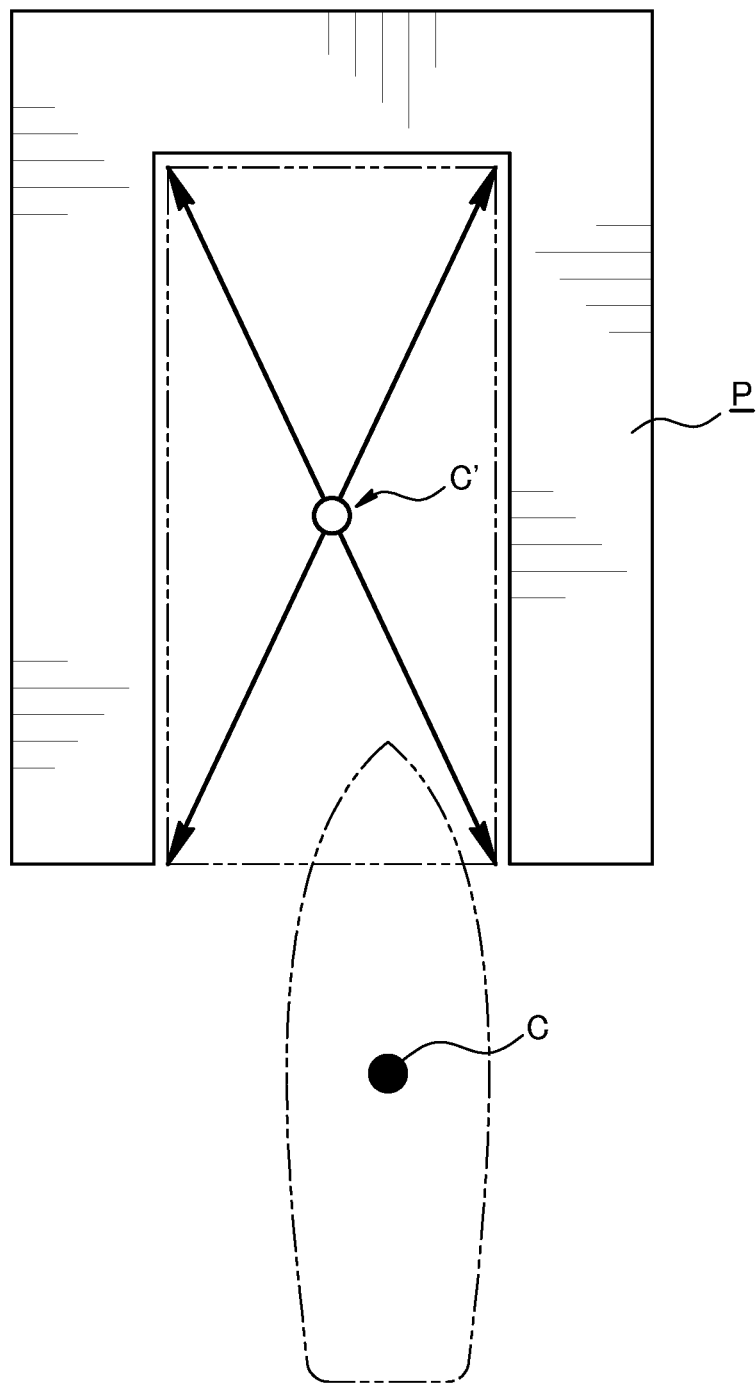
FIG. 11 is a simplified top view showing the process of maintaining the watercraft at a prescribed spot.

When an automatic piloting is selected by making a suitable input to the input unit 23 within the prescribed time period (ST5: Yes), an automatic piloting system to the selected optimum berthing spot is started. As an initial step of automatic piloting, a route from the current position to the optimum berthing spot is computed by the control unit 10 based on the data provided by the GNSS 21 in step ST7. The processor 11 then navigates the watercraft from the current position to the selected optimum berthing spot by controlling the watercraft operating device 7 in step ST 8 as shown in FIG. 10.

This step is continued until the watercraft reaches the optimum berthing spot (ST9: No). Once the watercraft reaches the optimum berthing spot (ST9: Yes), the control unit in 10 positions and maintains the own watercraft at the selected optimum berthing spot step ST10 so that the user may moor the watercraft to the pier P, and embark/disembark the watercraft in a comfortable manner. This can be accomplished by designating the centers of the own watercraft and the selected berthing spot C and C', and controlling the watercraft in such a manner that the two centers C and C' coincide with each other by a feedback control as shown in FIG. 12.

The present invention has been described with reference to a specific embodiment, but is not limited to the above embodiment, and can be modified without departing from the scope of the present invention. Not all of the components shown in the above embodiment are essential to the broad concept of the present invention, and may be appropriately selected, omitted, or substituted within the scope of the present invention.

The invention claimed is:

1. An automatic berthing system for watercraft, comprising:
   an environment sensor configured to detect objects around own watercraft; and
   a control unit configured to control the watercraft, and including a processor for processing an output of the environment sensor,
   wherein the processor is configured
   to create an environment map containing outer profiles and positions of the objects according to an output of the environment sensor;
   to identify a pier from the environment map;
   to extract vacant berthing spots as bounding boxes which exclude regions along the pier occupied by other watercraft from the environment map, the bounding boxes having widths and lengths larger than those of the own watercraft;
   to accept an optimum berthinq spot selection by a user to select an optimum berthing spot to berth thereat from the extracted vacant berthing spots; and
   to navigate the watercraft from a current position to the selected optimum berthinq spot.

2. The automatic berthing system for watercraft according to claim 1, further comprising a display device, wherein the processor is configured to display the environment map on the display device.

3. The automatic berthing system for watercraft according to claim 2, wherein the control unit comprises a storage device storing a regional map depicting a surrounding body of water, wherein the processor is configured to overlay the environment map and the regional map with each other on the display device.

4. The automatic berthing system for watercraft according to claim 2, wherein the environment sensor is configured to capture an image of an environment surrounding the watercraft, wherein the processor is configured to identify the pier from the captured image, extract the vacant berthing spots from regions located along the pier, and display the vacant berthing spots on the display device.

5. The automatic berthing system for watercraft according to claim 2, wherein the processor is configured to identify a plurality of piers from the captured image, detect the other watercraft moored to the piers, assign different classifications to the piers according to sizes of the other watercraft moored thereto, and assign different priorities to optimum berthing spot candidates according to the classifications of the piers which the vacant berthing spots belong to.

6. The automatic berthing system for watercraft according to claim 1, wherein the environment sensor comprises at least one of a visible light image sensor and a lidar.

7. The automatic berthing system for watercraft according to claim 1, wherein the environment sensor comprises a three-dimensional sensor, and the processor is configured to create a three-dimensional environment map from an output of the three-dimensional sensor, and convert the three-dimensional environment map into a two-dimensional environment map that covers a region extending over a prescribed vertical distance from a water surface.

8. The automatic berthing system for watercraft according to claim 7, wherein the prescribed vertical distance is greater than a height of the own watercraft.

9. The automatic berthing system for watercraft according to claim 1, wherein the processor is configured to accept a minimum size for the vacant berthing spot.

10. The automatic berthing system for watercraft according to claim 1, wherein the processor is configured to extract the vacant berthing spots as bounding boxes.

11. The automatic berthing system for watercraft according to claim 10, wherein a size of each vacant spot is evaluated by lengths of sides of the corresponding bounding box.

12. The automatic berthing system for watercraft according to claim 1, further comprising an input unit for accepting an initiation of an automatic berthing operation, wherein the processor is configured to start extracting the vacant berthing spots upon accepting the initiation of the automatic berthing operation.

13. The automatic berthing system for watercraft according to claim 12, wherein when multiple vacant berthing spots are extracted, the input unit is configured to accept a selection of one of the vacant berthing spots by the user.

14. The automatic berthing system for watercraft according to claim 12, wherein the input unit is configured to accept a selection of a heading of the own watercraft for the selected optimum berthing spot.

15. The automatic berthing system for watercraft according to claim 12, wherein the processor is configured to set the selected optimum berthing spot as a destination, generate a path for the own watercraft to reach the destination from a current position, and control the own watercraft to navigate to the destination via the generated path.

16. The automatic berthing system for watercraft according to claim 15, wherein the processor is configured to position and maintain the own watercraft at the selected optimum berthing spot after the own watercraft has reached the selected optimum berthing spot.

\* \* \* \* \*